(12) United States Patent
Criniere et al.

(10) Patent No.: US 10,718,034 B2
(45) Date of Patent: Jul. 21, 2020

(54) COMPOSITION IN THE FORM OF BRIQUETTES COMPRISING BURNT CALCIUM-MAGNESIUM COMPOUNDS, METHOD FOR OBTAINING SAME, AND USE THEREOF

(71) Applicant: S. A. Lhoist Recherche et Developpement, Ottignies-Louvain-la-Neuve (BE)

(72) Inventors: Guillaume Criniere, Braine-l'Alleud (BE); Michael Nispel, Louvain-la-Neuve (BE)

(73) Assignee: S. A. Lhoist Recherche et Developpement, Ottignies-Louvain-la (BE)

( * ) Notice: Subject to any disclaimer, the term of this patent is extended or adjusted under 35 U.S.C. 154(b) by 0 days.

(21) Appl. No.: 16/309,373

(22) PCT Filed: Jul. 7, 2017

(86) PCT No.: PCT/EP2017/067167
§ 371 (c)(1),
(2) Date: Dec. 12, 2018

(87) PCT Pub. No.: WO2018/007630
PCT Pub. Date: Jan. 11, 2018

(65) Prior Publication Data
US 2019/0256946 A1    Aug. 22, 2019

(30) Foreign Application Priority Data

Jul. 8, 2016 (BE) .................... 2016/5572

(51) Int. Cl.
*C22B 1/243* (2006.01)
*C04B 18/02* (2006.01)
*C22B 1/245* (2006.01)
*C04B 14/30* (2006.01)
(Continued)

(52) U.S. Cl.
CPC ............ *C22B 1/243* (2013.01); *C04B 14/308* (2013.01); *C04B 18/021* (2013.01);
(Continued)

(58) Field of Classification Search
CPC ....... C22B 1/243; C22B 1/245; C04B 14/308; C04B 18/021; C04B 22/064; C04B 22/066
See application file for complete search history.

(56) References Cited

U.S. PATENT DOCUMENTS

| 5,186,742 A | 2/1993 | Hoffman et al. |
| 10,307,766 B1 * | 6/2019 | DeGenova ............... C04B 2/10 |
| 2016/0115076 A1 * | 4/2016 | Criniere .................... C01F 5/02 |
| | | 106/457 |

FOREIGN PATENT DOCUMENTS

| EP | 2199417 A1 | 6/2010 |
| EP | 3042965 A1 | 7/2016 |

(Continued)

OTHER PUBLICATIONS

Espacenet family list for US 2016115076 earliest date #19 (Year: 2016).*

(Continued)

*Primary Examiner* — Tima M. McGuthry-Banks
(74) *Attorney, Agent, or Firm* — Whitaker Chalk Swindle & Schwartz PLLC; Charles D. Gunter, Jr.

(57) ABSTRACT

A composition based on quick calcium-magnesium compounds in the form of briquettes is shown, as well as a method for the preparation and use thereof. The composition of the briquettes contains quicklime in the form of milled particles at a concentration of at least 10% by weight and at most 100% by weight relative to the weight of the composition. The compositions in the form of briquettes have a Shatter test index of less than 10%.

17 Claims, 5 Drawing Sheets

(51) Int. Cl.
*C04B 22/06* (2006.01)
*C04B 111/00* (2006.01)

(52) U.S. Cl.
CPC .......... *C04B 22/064* (2013.01); *C04B 22/066* (2013.01); *C22B 1/245* (2013.01); *C01P 2006/12* (2013.01); *C04B 2111/0087* (2013.01); *C04B 2111/00732* (2013.01); *C04B 2111/00758* (2013.01); *C04B 2111/00887* (2013.01)

(56) References Cited

FOREIGN PATENT DOCUMENTS

| | | | |
|---|---|---|---|
| JP | 2001348609 A | 12/2001 | |
| WO | 2015007661 A1 | 1/2015 | |
| WO | WO 2015/007661 A1 * | 1/2015 | |

OTHER PUBLICATIONS

Vol. 24, No. 10., "Taking the Heat Out of Grinding", Article, 4 pages, Oct. 2010, Copyright Powder and Bulk Engineering, CSC Publishing, Inc. www.powderbulk.com/wp-content/uploads/pdf/pbe_2010110_058.pdf.

Garcia, E. A. S., et al., "Pelotizacao De Finos Calcario Utilzando Agua E Cal Virgem Como Agentes Aglomerantes", XXVI Encontro Nacional De Tratamento De Mineros E Metalugria Extrativa, vol. 1, 2015, 9 pages.

PCT/EP2017/067167, International Search Report, dated Oct. 18, 2017.

Barnett, Thomas P., "Roll-Press Briquetting: Compacting Fines to Reduce Waste Handling Costs", Article, 5 pages, copyright Powder and Bulk Engineering, CSC Publishing, Inc., Oct. 2010.

* cited by examiner

COMPOSITION IN THE FORM OF BRIQUETTES COMPRISING BURNT CALCIUM-MAGNESIUM COMPOUNDS, METHOD FOR OBTAINING SAME, AND USE THEREOF

The present invention relates to a composition in the form of briquettes comprising at least one quick calco-magnesian compound, said composition having between 40% to 100% by weight of CaO+MgO equivalent, preferably 60% to 100% by weight of CaO+MgO equivalent, relative to the weight of said composition.

For the purposes of the present invention, the terms "quick calco-magnesian compound" are understood to mean an inorganic solid material whose chemical composition is mainly calcium oxide and/or magnesium oxide. The quick calco-magnesian compounds according to the present invention therefore include quicklime (calcium lime), magnesian quicklime, dolomitic quicklime or quick calcined dolomite, also known as burnt dolomite. Quick calco-magnesian compounds contain impurities, namely compounds such as silicon dioxide, $SiO_2$ or even aluminium oxide, $Al_2O_3$, etc., in a quantity of a few percent. It is understood that these impurities are expressed in the aforementioned forms but may, in reality, appear in different phases. It also contains, in general, a few percent of residual $CaCO_3$ or $MgCO_3$, known as unburnt, and a few percent of residual $Ca(OH)_2$ or $Mg(OH)_2$, due to the partial hydration of the quick products during phases of cooling, handling and/or storage.

The term "quicklime" is understood to mean a solid mineral material, the chemical composition of which is mainly calcium oxide, CaO. Quicklime is commonly obtained owing to the calcination of limestone, mainly composed of $CaCO_3$. Quicklime contains impurities, i.e. compounds such as magnesium oxide MgO, silicon dioxide, $SiO_2$ or even aluminium oxide, $Al_2O_3$, etc., in a quantity of a few percent. It is understood that these impurities are expressed in the aforementioned forms but may, in reality, appear in different phases. It also contains, in general, a few percent of residual $CaCO_3$, known as unburnt, and a few percent of residual $Ca(OH)_2$, due to the partial hydration of calcium oxide CaO during phases of cooling, handling and/or storage.

According to the present invention, the term "briquette" is understood to mean a compact with an oblong shape, with a mass of approximately 5 to 100 g per briquette, inscribed in an oblate ellipsoid of revolution or a prolate ellipsoid of revolution. Typically, the briquettes are shaped like a bar of soap or are classified as "egg briquettes".

In contrast, tablets are different in that they are typically shaped like pellets, such as those produced by "Titan" presses from the company "Eurotab". By definition, tablets for industrial use have a regular shape, more specifically they are shaped like a cylinder and have a low height.

Briquettes are known from the prior art, see, for example, WO2015007661. According to this document, compacts (i.e. briquettes or tablets) are described comprising particles of calco-magnesian compound comprising at least 50% of quick calco-magnesian compound.

According to this document, mechanical strength when dropped is measured using a Shatter test. The compacts described generally have a Shatter test index of less than 10%.

The terms "Shatter test index" are understood to mean the mass percentage of fines smaller than 10 mm generated after four 2-metre drops from 10 kg of product. These fines are quantified by means of sifting through a 10-mm square mesh screen after four 2-metre drops.

A detailed analysis of the examples and counter-examples from this document indicates that raw tablets having mechanical strength when dropped were obtained using at least 50% of quick products, and that these tablets also display ageing resistance in a humid atmosphere. On the other hand, when briquettes of quick compounds are obtained using quick compounds, the Shatter test index representing mechanical strength is high (between 13 and 15%) and it is necessary to perform relatively long thermal treatment and typically at above 1200° C. if the aim is to achieve a Shatter test index of less than 10%.

Document U.S. Pat. No. 5,186,742 describes lime briquettes containing from 55 to 85% by weight of lime, from 10 to 40% by weight of ash and from 0.1 to 10% by weight of paper fibres and optionally a lubricant. The briquettes described in document U.S. Pat. No. 5,186,742 were tested for their strength when dropped; this test is not comparable to the test used to measure the Shatter test index and they have a compressive strength of between 150 and 300 pounds, which corresponds to a Shatter test index of much higher than 10%.

Calco-magnesian compounds are used in many industries, such as the iron and steel industry, gas treatment, wastewater and sludge treatment, agriculture, the construction industry, public works and others. They can be used either in the form of pebbles or fragments, or in the form of fines (usually smaller than 7 mm). In some industries, pebble form is nevertheless preferred.

This is the case, for example, in the iron and steel industry, when calcium and magnesium compounds are added to oxygen furnaces or electric arc furnaces.

During the production of these pebbles and fragments, numerous fines are generated. These fines typically have limited potential for use because they are difficult to transport and handle.

For many years, the aim, in many sectors, has been to transform compounds that initially come in the form of powder into briquettes in order to facilitate and render their transport, handling and use safe.

Lime producers always maintain a balance of materials between pebble calco-magnesian compounds and fines generated before and during calcination as well as during subsequent handling and operations. Nevertheless, in some cases, an excess of fines is produced. These fines can then be gathered together in the form of briquettes or equivalent, which not only offers the possibility of getting rid of the excess fines but also of artificially increasing the production of calcium and magnesium compounds in pebble form by adding these briquettes or equivalent to the pebbles.

The document written by Barnett et al (Roll-press briquetting: Compacting fines to reduce waste-handling costs, powder and bulk engineering, Vol. 24, No. 10, October 2010, 1-6) describes a method for manufacturing raw briquettes of lime. However, this document does not discuss production conditions or the mechanical properties of the briquettes obtained. Briquettes made from excess fines or equivalent generally have less mechanical strength than calcium and magnesium (calco-magnesian) compounds in pebble form. They also have significantly less ageing resistance during storage or handling than calcium and magnesium compounds in pebble form.

This explains the fact that, in practice, the briquetting of fines of calcium and magnesium compounds is not widely used at the moment. Taking into account the poor quality of the briquettes formed using this type of process, it is believed that briquetting produces a yield of less than 50%, owing to the presence of a very large number of unusable briquettes at the end of this type of process, which requires a recycling step.

Lubricants and binders are additives that are often used in processes for agglomeration into the form of briquettes or equivalent.

There are two types of lubricant: internal or external. Internal lubricants are intimately mixed with the materials to be briquetted. They encourage, on the one hand, the flowability of the mixture when the briquetter is being fed and, on the other hand, the rearrangement of the particles within the mixture during compression. External lubricants are applied to the surfaces of the rollers of the briquetter and are mainly used for demoulding. In both cases, they reduce friction on the surface and therefore wear. Lubricants may be liquids such as mineral oils, silicones, etc. or solids such as talc, graphite, paraffins, stearates, etc. In the case of compositions based on quick calco-magnesian compounds, stearates are preferred, and more particularly calcium stearate or magnesium stearate.

Binders are substances that are able to agglomerate particles, either by means of adhesive forces or a chemical reaction. These can be of mineral origin (cements, clays, silicates, etc.), of plant or animal origin (celluloses, starches, gums, alginates, pectin, glues, etc.), of synthetic origin (polymers, waxes, etc.). In many cases, they are used and applied with water, which activates their agglomeration properties.

Over the years, several of these additives have been used to increase the strength and durability of briquettes or equivalent of calcium and magnesium compounds, for example calcium stearate or paper fibres (see, for example, U.S. Pat. No. 5,186,742), though this has not led to significant improvements. Moreover, in many cases, the use of additives currently used for other manufactured industrial products is limited, as is the particular case for manufacturing calco-magnesian briquettes, either because the calco-magnesian compounds react violently with water, or because of a potentially negative effect of these additives on the final use of briquettes of calco-magnesian compounds.

U.S. Pat. No. 7,105,114 claims a briquetting method for fines of slaked (dolomitic) lime using from 0.5 to 5% by weight of binders containing pseudo-plastic carbon chains which clearly improve the mechanical properties of the briquettes, and which do not have the aforementioned disadvantages. However, this method only results in the production of briquettes of which half are already broken after being dropped from a height of between 0.9 and 1.8 m (a drop of between 3 and 6 feet), which constitutes a wholly insufficient mechanical strength.

Briquettes or equivalent based on calco-magnesian compounds can also be consolidated by means of thermal treatment at a very high temperature, which results in the sintering of said briquettes or equivalent. For example, in the case of burnt dolomite briquettes, it is known that thermal treatment of between one to several hours at a temperature of greater than 1200° C., and ideally greater than 1300° C., results in an increase in the mechanical properties of said briquettes. This thermal treatment at a very high temperature nevertheless results in a chronological evolution of the textural characteristics of the aforementioned briquettes, and in particular it results in a significant reduction in both the specific surface area and the pore volume. This is also accompanied by a significant reduction in water reactivity, as explained in standard EN 459-2:2010 E, which has several disadvantages for certain applications.

Therefore, there is a real need to develop briquettes of calco-magnesian compound that stand out from products such as briquettes that exist today, owing to a very clear improvement in their strength when dropped and also, preferably, owing to much better ageing resistance in a humid atmosphere, while still preserving the intrinsic properties (structural characteristics) of the calcium and magnesium compound before shaping, in particular its specific surface area and/or its pore volume, but especially its reactivity to water.

The aim of the invention is to mitigate the disadvantages of the prior art by providing a composition as mentioned at the start, characterised in that said quick calco-magnesian compound comprises quicklime in the form of milled particles at a concentration of at least 10% by weight and at most 100% by weight relative to the total weight of said composition, said composition in the form of briquettes having a Shatter test index of less than 10%.

Lime fines resulting from milling quicklime and therefore corresponding to a reduction in the size of pebble lime is called "quicklime in the form of milled particles". Grinding can interchangeably be performed from the unsorted material at the outlet of the furnace (furnace outlet) and/or at the outlet of the silo (silo outlet) or from the unsorted material at the outlet of the furnace and/or the outlet of the silo previously screened. Milling can be carried out using different types of grinding mills (hammer mill, impact crusher, etc.), either in an open circuit (no recirculation loop) or in a closed circuit (with recirculation loop).

Quicklime in the form of milled particles is different from screened lime. Lime fines resulting from the screening of lime are called "screened lime". The particle size is defined using the size of the screen. For example, a lime screened at 3 mm results in screened lime of 0-3 mm. Thus, screening on the unsorted material at the outlet of the furnace results in "primary" screened lime. Screening on the unsorted material at the outlet of the silo results in "secondary" screened lime.

For the purposes of the present invention, "quicklime in the form of milled particles" is understood to mean fines of lime generally containing more very fine particles than the fines of screened lime. Thus, if, for example, fines of 0-3 mm are considered, fines of quicklime in the form of milled particles will typically contain at least 30% by weight, most often at least 40% by weight, or even at least 50% by weight of very fine particles smaller than 100 μm, whereas fines of screened lime will often contain at most 25% by weight, or even at most 15% by weight of very fine particles of smaller than 100 μm.

The chemical composition of fines of milled lime is generally more homogeneous than that of screened lime fines. Thus, if we consider, for example, 10-50 mm pebble lime burnt with a fuel which generates ash, such as carbon (lignite, coal, anthracite, etc.) or petroleum coke, and if we characterise the 0-3 mm fines resulting from milling or screening this pebble lime, we will find that the 0-200 μm fraction of the 0-3 mm fines resulting from milling has a similar chemistry to that of the 200 μm-3 mm fraction, whereas the 0-200 μm fraction of the 0-3 mm fines resulting from screening contains more impurities than that of the 200 μm-3 mm fraction.

Milled lime fines are generally more reactive than screened lime fines. Thus, for soft-burnt quicklime, if the water reactivity (standard EN459) of the 0-3 mm fines is measured, the milled fines typically have $t_{60}$ values of less than 5 min where primary screened fines often have $t_{60}$ values of greater than 5 min.

As can be seen, the briquettes according to the present invention have a particularly advantageous Shatter test index of less than 10%, thereby lending the briquettes enough mechanical strength to be used industrially in most processes involving calco-magnesian compounds in the form of pebbles, on their own or in mixtures with pebbles.

Surprisingly, it was discovered, without it currently being possible to explain why, that the addition of quicklime in the form of milled particles at a concentration of at least 10% by weight relative to the weight of the composition made it possible to obtain significantly improved mechanical strength when dropped. A content as low as 10% by weight provides a significant improvement in mechanical strength, although the content of milled particles can reach up to 100% by weight.

For the purposes of the present invention, said quick calco-magnesian compound comprises one or more quick calco-magnesian compound(s). The quick calco-magnesian compound is selected from the group consisting of quicklime (calcium), magnesian lime, dolomitic quicklime, calcined dolomite and mixtures thereof, preferably in the form of particles, such as particles from screening, milling, filter dust and mixtures thereof. Said quick calco-magnesian compound may therefore be considered as a calco-magnesian component of the composition in the form of briquettes, which may contain other compounds. For the purposes of the present invention, the calco-magnesian compound is present in the composition at a concentration of at least 50% by weight, preferably at least 60% by weight, more preferably at least 70% by weight, more particularly at least 80% by weight, or even at least 90% by weight relative to the total weight of said composition.

According to the present invention, the terms "Shatter test index" are understood to mean the mass percentage of fines smaller than 10 mm generated as the result of four 2-metre drops using 10 kg of product (briquettes). These fines are quantified by means of sifting through a 10-mm square mesh screen after four 2-metre drops.

The % by weight of CaO+MgO equivalent is determined via X-ray fluorescence spectroscopy (XRF) as described in standard EN 15309. The semi-quantitative chemical analysis via XRF to determine the relative mass concentration of the elements whose atomic mass is between 16 (oxygen) and 228 (uranium), is performed using samples milled at 80 μm and shaped into pellets. The samples are introduced into a PANalytical/MagiX PRO PW2540 device, operating with wavelength dispersion. Measurement is taken with a power of 50 kV and 80 mA, with a Duplex detector.

The results of the analysis provide the content of calcium and magnesium and these measurements are reported by weight of CaO and MgO equivalent.

Advantageously, in the composition in the form of briquettes according to the present invention, said quick calco-magnesian compound is soft- or medium-burnt, preferably soft-burnt.

Quick calco-magnesian compounds, such as quicklime, are industrially produced by burning natural limestones in different types of kilns such as shaft kilns (dual-flow regenerative kilns, annular kilns, standard shaft kilns, etc.) or rotary kilns. The quality of the calco-magnesian compound, such as, for example, quicklime, particularly its reactivity to water, and the consistency of this quality, are partly related to the type of kiln used, the conditions of use of the kiln, the nature of the limestone from which the quick calco-magnesian compound originates in itself, or the nature and quantity of the fuel used. Therefore, it is theoretically possible to produce a whole range of quick calco-magnesian compounds, such as, for example, quicklime, with reactivity to water that ranges from very explosive to very slow.

In general, obtaining quicklime using soft burning (900-1000° C.) makes it possible to obtain a relatively reactive lime whereas obtaining a lime that is not very reactive involves over-burning at a higher temperature (1200-1400° C.). Over-burning often results in the production of quicklime of less stable quality in terms of water reactivity, because the calcination operation is performed in a thermal zone where the textural evolution of quicklime is quite substantial. This over-burnt quicklime is also more expensive to produce than softer lime because it is necessary to use higher temperatures but also because, besides using specific kilns, the production of this over-burnt quicklime results in intermediate production operations in order to switch between the production of soft quicklime which is more commonly used, which does pose problems in terms of stabilising calcination conditions and therefore problems in terms of quality stabilisation.

Quicklime obtained using soft burning generally has a specific surface area measured using nitrogen adsorption manometry after vacuum degassing at 190° C. for at least 2 hours and calculated in accordance with the multipoint BET method as described in standard ISO 9277:2010E of larger than 1 $m^2/g$, whereas over-burnt quicklime generally has a surface area of much smaller than 1 $m^2/g$.

In the scope of this invention, the reactivity of quicklime is measured using the water reactivity test from European standard EN 459-2:2010 E. Therefore, 150 g of quicklime is added with stirring in a cylindrical Dewar flask with a capacity of 1.7 $dm^3$ containing 600 $cm^3$ of deionised water at 20° C. Quicklime is supplied in the form of fines with a size of between 0 and 1 mm. Stirring at 250 revolutions per minute is performed using a specific blade. The temperature evolution is measured based on time, which enables a curve of reactivity to be traced. This curve can be used to deduce the value $t_{60}$, which is the time required to reach 60° C. The reactivity of burnt dolomite, also called quick dolomite, is measured using this same reactivity test. In this case, 120 g of burnt dolomite is added with stirring in a cylindrical Dewar flask with a capacity of 1.7 $dm^3$ containing 400 $cm^3$ of deionised water at 40° C. The burnt dolomite is supplied in the form of fines with a size of between 0 and 1 mm. Stirring at 250 revolutions per minute is performed using a specific blade. The temperature evolution is measured based on time, which enables a curve of reactivity to be traced. This curve can be used to deduce the value $t_{70}$, which is the time required to reach 70° C.

The composition according to the present invention advantageously comprises a soft- or medium-burnt calco-magnesian compound, preferably soft-burnt, which is therefore necessarily relatively reactive, thus providing reactive briquettes.

According to the present invention, a quick calco-magnesian compound, soft- or medium-burnt, preferably soft-burnt, is characterised by a value $t_{60}$ less than 10 min, preferably 8 min, preferably 6 min, and even more preferably 4 min when the quick calco-magnesian compound is a quicklime and by a value of $t_{70}$ less than 10 min, preferentially 8 min, preferably 6 min, and even more preferably 4 min when the quick calco-magnesian compound is a burnt dolomite.

In an advantageous embodiment of the composition according to the present invention, said quicklime in the form of milled particles is a soft- or medium-burnt quicklime, preferably soft-burnt.

Advantageously, said quicklime in the form of milled particles according to the present invention is very reactive to water, said reactivity characterised by a $t_{60}$ value of less than 10 min, preferably less than 8 min, preferably less than 6 min and more preferably less than 4 min.

In a particular embodiment, said briquettes have a maximum dimension of at most 50 mm, preferably of at most 40 mm, and more preferably of at most 30 mm.

This means that the briquettes of the composition in the form of briquettes pass through a screen with a square mesh with sides of 50 mm, preferably 40 mm, and in particular 30 mm, respectively.

Preferably, said briquettes have a maximum dimension of at least 10 mm, preferably of at least 15 mm, and more preferably of at least 20 mm.

The terms "a maximum dimension" are understood to mean a characteristic dimension of the briquette which is the maximum dimension, i.e., diameter, length, width, thickness, preferably, in the longitudinal direction of the oblong briquette.

In an embodiment of the composition in the form of briquettes according to the present invention, said briquettes are raw briquettes and have a BET specific surface area of larger than or equal to 1 m$^2$/g, preferably larger than or equal to 1.2 m$^2$/g, more preferably larger than or equal to 1.4 m$^2$/g.

In another embodiment of the composition in the form of briquettes according to the present invention, said briquettes are burnt briquettes and have a BET specific surface area of larger than or equal to 0.4 m$^2$/g, preferably larger than or equal to 0.6 m$^2$/g, more preferably larger than or equal to 0.8 m$^2$/g.

For the purposes of the present invention, the BET specific surface area is understood to mean the specific surface area measured using nitrogen adsorption manometry after vacuum degassing at 190° C. for at least 2 hours and calculated in accordance with the multipoint BET method as described in standard ISO 9277:2010E and expressed in m$^2$/g.

In another embodiment of the composition based on quick calco-magnesian compounds in the form of briquettes according to the invention, said briquettes are raw briquettes or burnt briquettes and have a porosity of greater than or equal to 20%, preferably greater than or equal to 22%, more preferably greater than or equal to 24%.

For the purposes of the present invention, porosity is understood to mean the total mercury pore volume determined using mercury intrusion porosimetry as per section 1 of standard ISO 15901-1:2005E, which involves dividing the difference between the skeletal density, measured at 30000 psia, and the apparent density, measured at 0.51 psia, by the skeletal density.

Alternatively, porosity can also be measured using petroleum intrusion porosimetry. The density and porosity of the briquettes are determined using kerosene intrusion, using a measurement protocol taken from standard EN ISO 5017. Measurements are taken from 5 briquettes.

The density of the briquettes is calculated using the formula m1/ (m3−m2)×Dp and the porosity in percentage is calculated using the formula (m3×m1)/(m3−m2)×100.

m1 is the mass of these 5 briquettes, m2 is the mass of these 5 briquettes immersed in petroleum and m3 is the mass of these 5 "wet" briquettes, i.e., impregnated with petroleum. Dp is the density of the petroleum.

In a particular embodiment according to the present invention, the composition is in the form of raw briquettes and the briquettes are very reactive to water, said reactivity being defined by a $t_{60}$ value of less than 10 min, preferably less than 8 min, preferably less than 6 min and more preferably less than 4 min.

In another embodiment according to the present invention, the composition is in the form of burnt briquettes and the briquettes are very reactive to water, said reactivity being defined by a $t_{60}$ value of less than 10 min, preferably less than 8 min, preferably less than 6 min and more preferably less than 4 min.

More particularly, according to the present invention, when the composition is in the form of raw briquettes and when the calco-magnesian compound is mainly quicklime, said composition has a reactivity value $t_{60}$ of less than 10 min, preferably less than 8 min, preferably less than 6 min and even more preferably less than 4 min. If fluxes or, for example, an iron oxide, are present, in order to take account of the content of fluxes, such as, for example, an iron-based compound in the composition, slightly more than 150 g of said composition is added to the reactivity test in order to get the equivalent of 150 g of quicklime added.

Advantageously, according to the present invention, when the composition is in the form of raw briquettes and when the calco-magnesian compound is mainly burnt dolomite, said composition has a $t_{70}$ reactivity value of less than 10 min, preferably less than 8 min, preferably less than 6 min and even more preferably less than 4 min. If fluxes or, for example, an iron oxide, are present, in order to take account of the content of fluxes, such as, for example, an iron-based compound in the composition, slightly more than 120 g of said composition is added to the reactivity test in order to get the equivalent of 120 g of burnt dolomite added.

More particularly, according to the present invention, when the composition is in the form of burnt briquettes and when the calco-magnesian compound is mainly quicklime, said composition has a $t_{60}$ reactivity value of less than 10 min, preferably less than 8 min, preferably less than 6 min and even more preferably less than 4 min. If fluxes or, for example, an iron oxide, are present, in order to take account of the content of fluxes, such as, for example, an iron-based compound in the composition, slightly more than 150 g of said composition is added to the reactivity test in order to get the equivalent of 150 g of "free" lime added. "Free" quicklime is understood to mean quicklime that has not reacted with iron oxide resulting in the calcium ferrites Ca Fe$_2$O$_4$ and/or Ca $_2$Fe$_2$O$_5$.

In an advantageous embodiment of the composition according to the present invention, said quicklime in the form of milled particles is present at a concentration of at least 15%, preferably at least 20%, and more preferably at least 30%, in particular at least 40% by weight relative to the total weight of said composition.

Advantageously, in the composition according to the present invention, said quicklime in the form of milled particles is present at a concentration of at most 90% by weight, preferably at most 80%, preferably at most 70%, more preferably at most 50% by weight, relative to the total weight of said composition.

In a preferred form of the invention, the composition based on quick calco-magnesian compounds in the form of briquettes further comprises a binder or a lubricant, preferably in the form of powder or concentrated aqueous suspension, more particularly selected from the group consisting of binders of mineral origin such as cements, clays, silicates, binders of plant or animal origin, such as celluloses, starches, gums, alginates, pectin, glues, binders of synthetic origin, such as polymers, waxes, liquid lubricants such as mineral oils or silicones, solid lubricants such as talc, graphite, paraffins, stearates, in particular calcium stearate, magnesium stearate, and mixtures thereof, preferably calcium stearate and/or magnesium stearate, with a content of between 0.10 and 1% by weight, preferably between 0.15 and 0.6% by weight, more preferably between 0.20 and 0.50% by weight relative to the total weight of said composition.

More particularly, according to the invention, said briquettes have an average weight per briquette of at least 5 g, preferably of at least 10 g, more preferably of at least 12 g, and in particular of at least 15 g.

Advantageously, according to the invention, said briquettes have an average weight per briquette of less than or equal to 100 g, preferably less than or equal to 60 g, more preferably less than or equal to 40 g, and in particular less than or equal to 30 g.

In yet another preferred embodiment according to the invention, said briquettes have an apparent density of between 2 g/cm$^3$ and 3.0 g/cm$^3$, advantageously between 2.2 g/cm$^3$ and 2.8 g/cm$^3$.

In a particular embodiment according to the present invention, said quick calco-magnesian compound further comprises fine particles of calco-magnesian compound selected from fine particles rejected during screening for the production of pebbles of said quick calco-magnesian compound, calco-magnesian filter dust and mixtures thereof, at a concentration of at least 10% by weight and at most 90% by weight relative to the total weight of said composition.

Advantageously, in the composition in the form of briquettes according to the present invention, said fine particles rejected during screening when producing pebbles of calco-magnesian compound are fine particles of quick dolomite.

In a preferred embodiment, said fine particles rejected at screening when producing pebbles of calco-magnesian compound are fine particles of quicklime.

Advantageously, in the composition of briquettes according to the present invention, said fine particles rejected during screening are fine particles rejected at 7-mm screening during said production of pebbles of said calco-magnesian compound.

More particularly, in the composition of briquettes according to the present invention, said fine particles rejected at screening are fine particles rejected at 5-mm screening during said production of pebbles of said calco-magnesian compound.

Even more advantageously, said fine particles rejected at screening are fine particles rejected at 3-mm screening during said production of pebbles of said calco-magnesian compound.

In a particular embodiment of the present invention, said fine particles rejected at screening are a mixture of fine particles rejected at 7-mm screening during said production of pebbles of said calco-magnesian compound and/or fine particles rejected at 5-mm screening during said production of pebbles of said calco-magnesian compound and/or fine particles rejected at 3-mm screening during said production of pebbles of said calco-magnesian compound.

The fine particles rejected at screening therefore advantageously have a particle size $d_{100}$ of smaller than or equal to 7 mm, in particular smaller than or equal to 5 mm, more particularly smaller than or equal to 3 mm; a $d_{90}$ of smaller than or equal to 3 mm and a $d_{50}$ of smaller than or equal to 1 mm.

For the purposes of the present invention, unless otherwise specified, the notation $d_x$ represents a diameter expressed in μm, measured using laser granulometry in methanol without sonication, relative to which x % by volume of measured particles are smaller or the same.

In another particular embodiment according to the present invention, said composition in the form of briquettes further comprises one or more iron-based compound(s) at a concentration of at least 3% by weight and at most 60% by weight expressed as $Fe_2O_3$ equivalent relative to the total weight of said composition.

In another preferred embodiment of the present invention, at least one of the iron-based compound(s) is a compound based on iron oxide, preferably active iron, present at a concentration of at least 3% by weight and at most 60% by weight expressed as $Fe_2O_3$ equivalent relative to the total weight of said composition.

Advantageously, said composition in the form of briquettes comprises at least 50% by weight of calcium expressed as CaO equivalent, relative to the total weight of said composition.

In particular, said composition in the form of briquettes comprises a Ca/Mg mole ratio that is greater than or equal to 1, preferably greater than or equal to 2, more preferably greater than or equal to 3.

In a very particular embodiment of the present invention, wherein the raw briquettes contain an iron-based compound which is an iron oxide-based compound, said raw briquettes may advantageously be subjected to thermal treatment at a temperature of between 700° C. and 1200° C., preferably between 900° C., even 1050° C. and 1200° C., particularly at around 1100° C., for a predetermined duration, for example between 5 and 20 minutes, preferably greater than or equal to 7 minutes and less than or equal to 15 minutes, resulting in burnt briquettes being formed and obtained, wherein the iron oxide-based compound is converted, at least partially, to calcium ferrites.

For the purposes of the present invention, said one iron-based compound may be formed from one or more iron-based compounds, together totalling a content of 3 to 60% in the composition by weight relative to the total weight of said composition.

In a particular embodiment, the composition according to the present invention is packaged in types of containers with a contents volume of greater than 1 m$^3$ such as large bags, containers, silos and equivalent, preferably sealed.

In an advantageous variant of the present invention, the composition in the form of briquettes is composed of raw briquettes with a Shatter test index of less than 8%, preferably less than 6%, and even more preferably less than 5%, in particular less than 4%.

In another advantageous variant of the present invention, the composition in the form of briquettes is composed of burnt briquettes with a Shatter test index of less than 6%, preferably less than 4%, and even more preferably less than 3%, in particular less than 2%, or even less than 1.5%.

Other embodiments of the composition in the form of briquettes according to the invention are indicated in the appended claims.

The aim of the invention is also a method for manufacturing a composition in the form of briquettes.

The method is characterised in that it comprises the following steps:

a) provision of a pulverulent mixture comprising at least 40% by weight of CaO+MgO equivalent relative to the weight of said pulverulent mixture, and comprising at least one quick calco-magnesian compound, said at least one quick calco-magnesian compound comprising quicklime in the form of milled particles at a concentration of at least 10% by weight and at most 100% by weight relative to the total weight of said pulverulent mixture, b) feeding a roller press with said mixture, c) compression in said roller press of said substantially homogeneous mixture, said rollers of the roller press developing linear speeds on the periphery of the rollers of between 10 and 100 cm/s, preferably between 20 and 80 cm/s, and linear pressures of between 60 and 160 kN/cm, preferably between 80 and 140 kN/cm, and even more preferably between 80 and 120 kN/cm resulting in a composition in the form of raw briquettes being obtained, and d) collection of said raw briquettes.

In a particular form of the invention, said pulverulent mixture comprises at most 100% by weight, preferably at most 90% by weight, preferably at most 88%, in some embodiments, at most 80% by weight, more preferably at most 60% by weight of CaO+MgO equivalent relative to the weight of said composition.

Optionally, in the method according to the invention, step a) takes place in the presence of a binder or a lubricant, preferably provided in the form of powder or concentrated aqueous suspension, more particularly selected from the group consisting of binders of mineral origin such as cements, clays, silicates, binders of plant or animal origin, such as celluloses, starches, gums, alginates, pectin, glues, binders of synthetic origin, such as polymers, waxes, liquid lubricants such as mineral oils or silicones, solid lubricants such as talc, graphite, paraffins, stearates, in particular calcium stearate, magnesium stearate, and mixtures thereof, preferably calcium stearate and/or magnesium stearate, with a content of between 0.1 and 1% by weight, preferably between 0.15 and 0.6% by weight, more preferably between 0.2 and 0.5% by weight relative to the total weight of said briquettes.

Advantageously, the method according to the present invention also involves a step wherein said raw collected briquettes are thermally treated at a temperature of between 700° C. and 1200° C., preferably of around 900° C. for a predetermined duration of between 5 and 20 minutes, preferably greater than or equal to 7 minutes and less than or equal to 15 minutes, resulting in burnt briquettes being formed and obtained.

Preferably, said homogeneous mixture supplied in the method according to the invention comprises a quick soft- or medium-burnt calco-magnesian compound, preferably soft-burnt.

Advantageously, said quicklime in the form of milled particles, of said substantially homogeneous mixture supplied in the method according to the invention, is a soft- or medium-burnt quicklime, preferably soft-burnt.

Advantageously, said quick calco-magnesian compound is quicklime. In another advantageous embodiment, said quicklime in the form of milled particles, of said substantially homogeneous mixture supplied in the method according to the invention, is very reactive to water, characterised by a $t_{60}$ value of less than 10 min, preferably less than 8 min, preferentially less than 6 min and more preferably less than 4 min.

In a further advantageous embodiment, said quicklime in the form of milled particles, of said substantially homogeneous mixture supplied in the method according to the invention, is obtained by milling using pebble quicklime, the size of which is larger than 3 mm, preferably larger than 5 mm, preferably larger than 7 mm, and even more preferably larger than 10 mm, and smaller than 120 mm, preferably smaller than 100 mm, preferably smaller than 80 mm, and even more preferably smaller than 60 mm.

In a preferred embodiment, said at least one quick calco-magnesian compound comprises quicklime in the form of milled particles at a concentration of at least 15% by weight, particularly at least 20% by weight, more preferentially at least 30% by weight, in particular preferably at least 40% by weight, relative to the total weight of said substantially homogeneous pulverulent mixture.

In another preferred embodiment, said substantially homogeneous mixture based on quick calco-magnesian compounds in the method according the invention, comprises quicklime in the form of milled particles at a concentration of at most 90% by weight, particularly at most 80% by weight, more preferably at most 70% by weight, more preferably at most 50% by weight, relative to the total weight of said substantially homogeneous pulverulent mixture.

In a particular embodiment of the present invention, said quick calco-magnesian compound further comprises fine particles of calco-magnesian compound selected from fine particles rejected during screening for the production of pebbles of said quick calco-magnesian compound, calco-magnesian filter dust and mixtures thereof, at a concentration of at least 10% by weight and at most 90% by weight relative to the total weight of said substantially homogeneous pulverulent mixture.

Advantageously, said fine particles rejected during screening when producing pebbles of calco-magnesian compound are fine particles of quick dolomite.

In a preferred embodiment, said fine particles rejected at screening when producing pebbles of calco-magnesian compound are fine particles of quicklime.

Advantageously, said fine particles rejected during screening are fine particles rejected at 7-mm screening during said production of pebbles of said calco-magnesian compound.

More particularly, said fine particles rejected during screening are fine particles rejected at 5-mm screening during said production of pebbles of said calco-magnesian compound.

Even more advantageously, said fine particles rejected at screening are fine particles rejected at 3-mm screening during said production of pebbles of said calco-magnesian compound.

In a particular embodiment of the present invention, said fine particles rejected at screening are a mixture of fine particles rejected at 7-mm screening during said production of pebbles of said calco-magnesian compound and/or fine particles rejected at 5-mm screening during said production of pebbles of said calco-magnesian compound and/or fine particles rejected at 3-mm screening during said production of pebbles of said calco-magnesian compound.

The fine particles rejected at screening therefore advantageously have a particle size $d_{100}$ of smaller than or equal to 7 mm, in particular smaller than or equal to 5 mm, more particularly smaller than or equal to 3 mm; a $d_{90}$ of smaller than or equal to 3 mm and a $d_{50}$ of smaller than or equal to 1 mm.

For the purposes of the present invention, unless otherwise specified, the notation $d_x$ represents a diameter expressed in µm, measured using laser granulometry in methanol without sonication, relative to which x % by volume of measured particles are smaller or the same.

In another particular embodiment according to the present invention, said substantially homogeneous pulverulent mixture further comprises one or more iron-based compound(s), at a concentration of at least 3% by weight and at most 60% by weight expressed as $Fe_2O_3$ equivalent relative to the weight of said mixture.

In a preferred embodiment of the present invention, at least one or more of the iron-based compounds is a compound based on iron oxide present at a concentration of at least 3% by weight and at most 60% by weight expressed as $Fe_2O_3$ equivalent relative to the total weight of said substantially homogeneous mixture, preferably active iron.

Advantageously, said substantially homogeneous mixture based on quick calco-magnesian compounds comprises at least 50% by weight of calcium expressed as CaO equivalent, relative to the total weight of said mixture.

In particular, said substantially homogeneous mixture based on calco-magnesian compounds comprises a Ca/Mg mole ratio that is greater than or equal to 1, preferably greater than or equal to 2, more preferably greater than or equal to 3.

In a very particular embodiment of the present invention, wherein the raw briquettes contain an iron-based compound which is an iron oxide-based compound, the method further comprises thermal treatment of said collected raw briquettes, at a temperature of between 700° C. and 1200° C., preferably between 900° C., even 1050° C. and 1200° C., more particularly at around 1100° C., for a predetermined duration, for example between 5 and 20 minutes, preferably greater than or equal to 7 minutes and less than or equal to 15 minutes, resulting in burnt briquettes being formed and obtained, wherein the iron oxide-based compound is converted, at least partially, to calcium ferrites.

In a preferred embodiment of the invention, the method further comprises, before said provision of a substantially homogeneous pulverulent mixture, a) feeding a mixer with said at least one quick calco-magnesian compound and b) mixing for a predetermined period, long enough to obtain a substantially homogeneous pulverulent mixture of said at least one quick calco-magnesian compound.

Other embodiments of the method according to the invention are indicated in the appended claims.

The present invention also relates to a use of raw or burnt briquettes according to the present invention, in the iron and steel industry, in particular in the manufacture of steel in basic oxygen furnaces, in electric arc furnaces, or even in secondary metallurgy, in flue gas treatment, in water treatment, in sludge and wastewater treatment, in agriculture, in the construction and public works industry, for example for soil stabilisation.

The invention also relates to the use of a composition in the form of briquettes, in the form of raw briquettes or in the form of burnt briquettes according to the present invention, in the iron and steel industry, in particular in oxygen furnaces or in electric arc furnaces.

More particularly, the raw or burnt briquettes according to the present invention are used in oxygen furnaces or in electric arc furnaces, mixed with briquettes of quick calco-magnesian compounds or with pebbles of quick calco-magnesian compounds.

Indeed, during the first few minutes of the refining process, there is not enough slag available in the reaction vessel for the dephosphorisation reaction to begin effectively in the methods from the prior art. The use of the composition according to the present invention, therefore doped with fluxes, is found to melt more rapidly than pebble lime, and helps to form liquid slag sooner at the beginning of the process, compared with conventional processes, as a result of a homogeneous mixture and the shaping of this homogeneous mixture which makes it possible to further accelerate the slag formation process and to minimise the formation of slag components with high melting points such as calcium silicates which are usually formed during the aforementioned method from the prior art.

In a preferred embodiment of the method according to the present invention, the method further comprises a pre-treatment step of the briquettes under modified atmosphere containing at least 2 vol % $CO_2$ and at most 30 vol % $CO_2$, preferably at most 25 vol % $CO_2$, preferably at most 20 vol % $CO_2$, more preferably at most 15 vol % $CO_2$, even more preferably at most 10 vol % $CO_2$ with respect to the modified atmosphere.

It has been indeed identified according to the present invention that a pre-treatment under such modified atmosphere containing such $CO_2$% with respect to the modified atmosphere allows to increase the mechanical strength of the briquettes.

The aim of the invention is also the use of a composition in the form of raw briquettes or in the form of burnt briquettes in a method for refining molten metal, in particular dephosphorisation of molten metal and/or desulphurisation of molten metal and/or reduction of the loss of refined metal in the slag.

The use of a composition in the form of raw briquettes or burnt briquettes according to the present invention in a method for refining molten metal comprises at least one step involving introducing hot metal and optionally iron-based waste into a vessel, at least one step involving introducing a composition in the form of raw briquettes or in the form of burnt briquettes according to the present invention, preferably in the form of burnt briquettes according to the present invention, at least one step involving blowing oxygen into said vessel, at least one step involving the formation of slag with said briquette composition in said vessel, at least one step involving obtaining refined metal with a reduced content of phosphorus and/or sulphurous compounds and/or an increased content of refined metal from the hot metal by dephosphorisation and/or desulphurisation, and at least one step involving unloading said refined metal with a reduced content of phosphorus and/or sulphurous components and/or an increased content of refined metal.

The use according to the present invention further comprises a step of adding quicklime, preferably pebble quicklime or quicklime compacts, particularly quicklime tablets or briquettes.

Other forms of use according to the invention are indicated in the appended claims.

Other characteristics, details and advantages of the invention will be included in the description provided below, by way of non-limiting example and with reference to the figures and examples.

Figure 4:
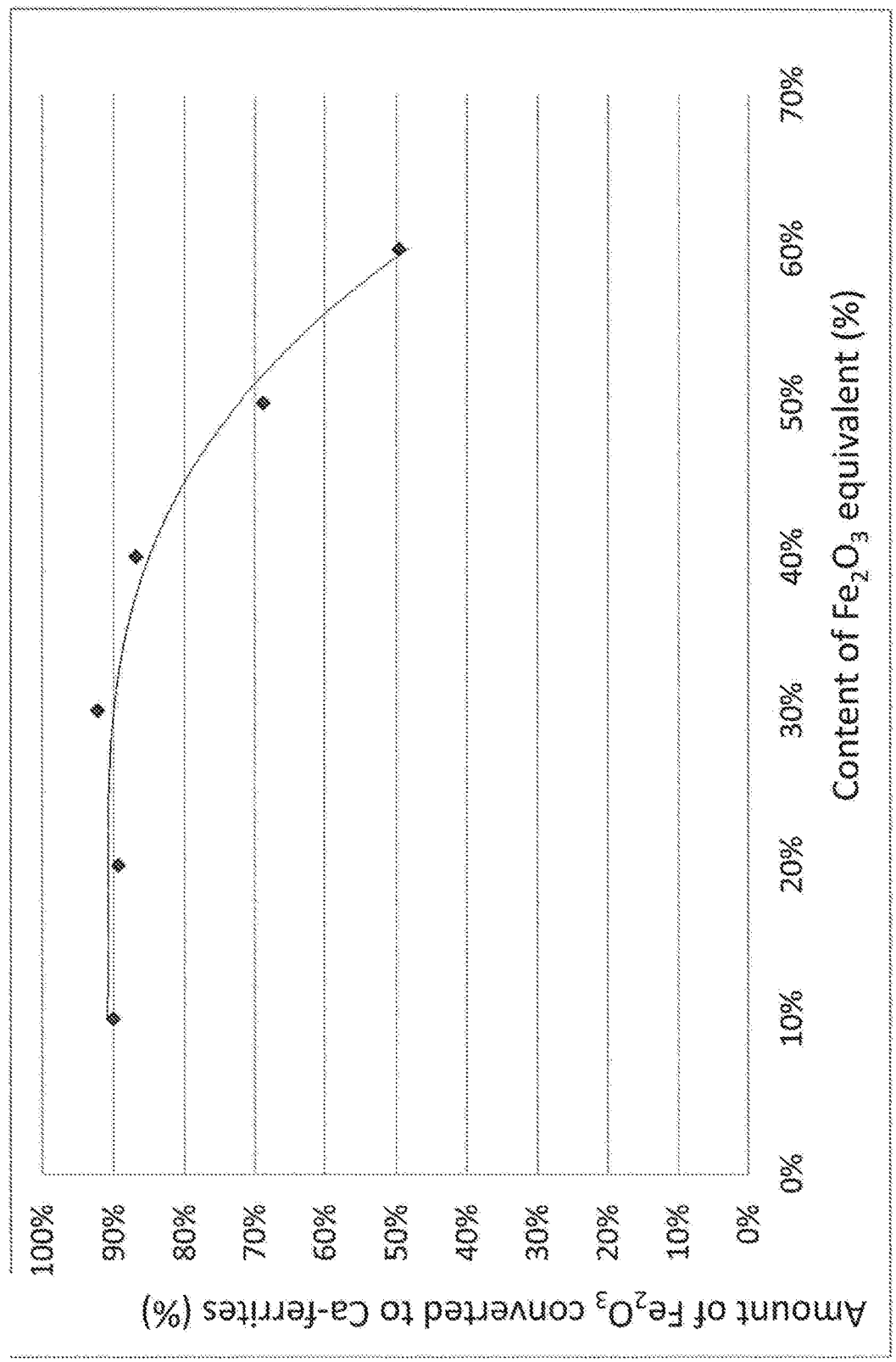
Figure 5:
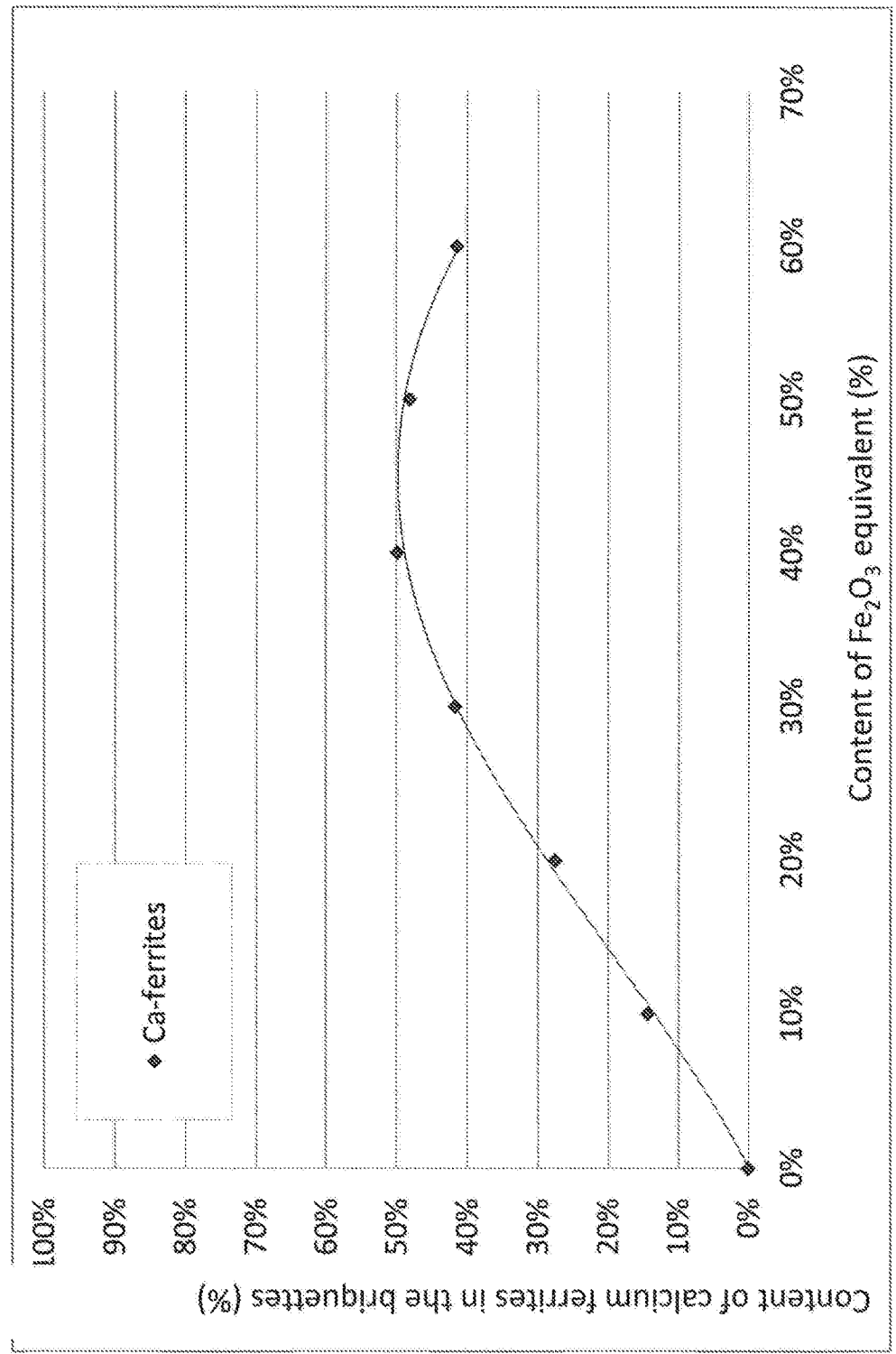

FIG. 4 is a graph of the % in $Fe_2O_3$ converted to calcium ferrites depending on the content of $Fe_2O_3$ equivalent in the burnt briquettes according to the present invention FIG. 5 is a graph of the evolution of the content of calcium ferrites expressed as $Fe_2O_3$ equivalent in the burnt briquettes depending on the content of iron oxide expressed as $Fe_2O_3$ equivalent in the raw briquettes before thermal treatment.

The present invention relates to a method for briquetting a composition comprising at least one quick calco-magnesian compound comprising quicklime in the form of milled particles at a concentration of at least 10% by weight and at most 100% by weight relative to the total weight of said composition.

The briquetting method according to the invention comprises a supply of a substantially homogeneous pulverulent mixture comprising at least one quick calco-magnesian compound.

Depending on the intended use of the briquettes, it is possible to add additives, such as, for example, in the case of use in the iron and steel industry, fluxes, such as $B_2O_3$, $NaO_3$, calcium aluminate, calcium silicate, a calcium ferrite such as $Ca_2Fe_2O_3$ or $CaFe_2O_4$, metallic Al, metallic Mg, metallic Fe, metallic Mn, metallic Mo, metallic Zn, metallic Cu, elemental Si, $CaF_2$, C, $Cac_2$, alloys such as CaSi, Ca Mg, CaFe, FeMn, FeSi, FeSiMn, FeMo; $TiO_2$, a molybdenum-based oxide, a copper-based oxide, a zinc-based oxide, a molybdenum-based hydroxide, a copper-based hydroxide, a zinc-based hydroxide and mixtures thereof.

The substantially homogeneous pulverulent mixture is fed into a roller press of a briquetter, also occasionally referred to as a tangential press, for example a Komarek, Sahut Konreur, Hosokawa Bepex, Köppern press.

In the roller press, the substantially homogeneous pulverulent mixture is compressed, optionally in the presence of a binder or a lubricant, preferably provided in the form of powder or concentrated aqueous suspension, more particularly selected from the group consisting of binders of mineral origin such as cements, clays, silicates, binders of plant or animal origin, such as celluloses, starches, gums, alginates, pectin, glues, binders of synthetic origin, such as polymers, waxes, liquid lubricants such as mineral oils or silicones, solid lubricants such as talc, graphite, paraffins, stearates, in particular calcium stearate, magnesium stearate, and mixtures thereof, preferably calcium stearate and/or magnesium stearate, with a content of between 0.1 and 1% by weight, preferably between 0.15 and 0.6% by weight, more preferably between 0.2 and 0.5% by weight relative to the total weight of said mixture.

During use, the rollers of the roller press develop linear speeds on the periphery of the rollers of between 10 and 100 cm/s, preferably between 20 and 80 cm/s, and linear pressures of between 60 and 160 kN/cm, preferably between 80 and 140 kN/cm, and even more preferably between 80 and 120 kN/cm.

By considering an angle of ½ degree on which the linear pressure is applied on the surface of the sleeves, it is possible to calculate a surface pressure which is equal to the linear pressure divided by $(½·\pi D)/360$ where D is the diameter of the sleeves expressed in cm. The surface pressure is between 300 and 500 MPa, preferably between 300 and 450 MPa, and more preferably between 350 and 450 MPa.

At the end of compression, the calco-magnesian composition in the form of raw briquettes is obtained and the latter are collected.

In a preferred embodiment of the method according to the present invention, the collected raw briquettes are thermally treated at a temperature of between 700° C. and 1200° C., preferably between 700° C. et 1000° C., preferably between 800° C. and 1000° C. for a predetermined period of time.

The raw briquettes are then taken into a high-temperature furnace where they undergo thermal treatment at a temperature of less than or equal to 1200° C., preferably less than or equal to 1000° C. They are then cooled and collected in the form of burnt briquettes in order to, among other things, improve their ageing resistance and their strength when dropped.

The period of thermal treatment is related to the temperature of the thermal treatment (the higher the temperature, the shorter the period) and the thickness of the bed of briquettes (the time increases with the thickness of the bed in order to allow time for the heat to diffuse inside the bed). Thus, under "monolayer" conditions, the thermal treatment is preferably performed at around 900° C., for example for a predetermined duration of between 3 and 20 minutes, preferably greater than or equal to 5 minutes and less than or equal to 15 minutes, more particularly greater than or equal to 7 minutes and less than or equal to 13 minutes, resulting in burnt briquettes being formed and obtained. Under "monolayer conditions", each temperature decrease of 50° C. in the thermal treatment results in the thermal treatment duration being doubled.

When the thermal treatment is performed under "multi-layer" conditions, i.e. the briquettes are in the form of a static bed of briquettes of a certain thickness, it is understood that the thermal treatment period needs to be increased in order to allow time for the heat to penetrate the core of the bed of briquettes. By way of illustration, for a bed thickness of 100 mm, the thermal treatment is preferably performed at around 900° C. for a predetermined duration of between 6 and 40 minutes, preferably greater than or equal to 10 minutes and less than or equal to 30 minutes, more particularly greater than or equal to 14 minutes and less than or equal to 26 minutes. By way of example, thermal treatment for a duration of 10 to 20 minutes at 900° C. is sufficient for a layer of briquettes of up to 100 to 150 mm thick inside the furnace. Typically, the duration of thermal treatment needs to be doubled in order to achieve a 50° C. decrease in temperature.

The quick calco-magnesian compound is advantageously a soft- or medium-burnt calco-magnesian compound, preferably soft-burnt.

In a very particular embodiment of the present invention, wherein the raw briquettes contain an iron-based compound which is an iron oxide-based compound, the method further comprises a step wherein said collected raw briquettes are subjected to thermal treatment at a temperature of between 900° C. and 1200° C., preferably between 1050° C. and 1200° C., particularly at around 1100° C. for a predetermined duration resulting in burnt briquettes being formed and obtained, wherein the iron oxide-based compound is converted, at least partially, to calcium ferrites.

The raw briquettes are then taken into a high-temperature furnace where they undergo thermal treatment at a temperature of less than or equal to 1200° C. They are then cooled and collected in the form of burnt briquettes in order to, among other things, encourage the formation of calcium ferrites, sought for applications in the iron and steel industry, and improve their ageing resistance as well as their strength when dropped.

The period of thermal treatment is related to the temperature of the thermal treatment (the higher the temperature, the shorter the period) and the thickness of the bed of briquettes (the time increases with the thickness of the bed in order to allow time for the heat to diffuse inside the bed). Thus, under "monolayer" conditions, the thermal treatment is preferably performed at around 1100° C., for a predetermined duration of between 3 and 20 minutes, preferably greater than or equal to 5 minutes and less than or equal to 15 minutes, more particularly greater than or equal to 7 minutes and less than or equal to 13 minutes, resulting in burnt briquettes being obtained, wherein said active iron oxide is converted to calcium ferrite. Under "monolayer conditions", each temperature decrease of 50° C. in the thermal treatment results in the thermal treatment duration being doubled.

When the thermal treatment is performed under "multilayer" conditions, i.e. the briquettes are in the form of a static bed of briquettes of a certain thickness, it is understood that the thermal treatment period needs to be increased in order to allow time for the heat to penetrate the core of the bed of briquettes. By way of illustration, for a bed thickness of 100 mm, the thermal treatment is preferably performed at around 1100° C. for a predetermined duration of between 6 and 40 minutes, preferably greater than or equal to 10 minutes and less than or equal to 30 minutes, more particularly greater than or equal to 14 minutes and less than or equal to 26 minutes.

In order to perform these thermal treatments, a horizontal furnace such as, for example, a tunnel furnace, a continuous furnace, a bogie furnace, a roller furnace or a mesh belt conveyor furnace may be used. Alternatively, any other type of conventional furnace can be used, though should not result in the integrity of the compacts being altered, for example due to excessive attrition. Cooling may either be performed conventionally in the downstream section of the furnace or outside the furnace, for example in a vertical counterflow cooler for cooling air or even in a fluid bed cooler using cooling air in the case of quenching.

In a particular embodiment, cooling at the end of thermal treatment is performed rapidly in less than 15 minutes, preferably in less than 10 minutes, in a fluidised bed by means of the cooling air.

In a preferred embodiment according to the present invention, the method comprises, before said provision of a substantially homogeneous pulverulent mixture,
a) feeding a mixer with said at least one quick calco-magnesian compound and
b) mixing for a predetermined period, long enough to obtain a substantially homogeneous pulverulent mixture of said at least one quick calco-magnesian compound.

In a variant of the invention, the substantially homogeneous mixture based on calco-magnesian compound comprises at least 10% by weight of milled quicklime particles, preferably at least 20% by weight, more particularly at least 30% by weight and at most 100% by weight relative to the total weight of said mixture.

The "raw" briquettes are advantageously based on quicklime (optionally dolomitic) in the form of particles rejected at screening when manufacturing pebbles and quicklime in the form of milled particles.

They are also characterised by a mass content of calcium and magnesium of at least 40%, preferably at least 60%, preferably at least 70% and at most 100%, preferably 95%, expressed as CaO and MgO equivalent. The chemical analysis is performed using XRF.

The % by weight of CaO+MgO and $Fe_2O_3$ equivalent is determined via X-ray fluorescence spectroscopy (XRF) as described in standard EN 15309. The semi-quantitative chemical analysis via XRF to determine the relative mass concentration of the elements whose atomic mass is between 16 (oxygen) and 228 (uranium), is performed using samples milled at 80 μm and shaped into pellets. The samples are introduced into a PANalytical/MagiX PRO PW2540 device, operating with wavelength dispersion. Measurement is taken with a power of 50 kV and 80 mA, with a Duplex detector.

The results of the analysis provide the content of calcium, magnesium and iron and these measurements are reported by weight of CaO and MgO equivalent and by weight of $Fe_2O_3$ equivalent.

They preferentially contain 0.1 to 1% of lubricant, for example stearate such as calcium or magnesium stearate, preferably 0.2 to 0.5% by weight.

They come in the form of briquettes (typically shaped like soap bars, ovoids, chippings, etc. known to those skilled in the art and are produced using tangential roller presses) and have a size of at least 10 mm, preferably at least 15 mm and at most 50 mm, preferably at most 40 mm, preferably at most 30 mm, so that they can pass through a square mesh screen.

The raw briquettes of the composition have good mechanical strength characterised by a Shatter Test Index ("STI", i.e., the mass percentage of fines smaller than 10 mm after four 2-metre drops, less than 8%, preferentially less than 6%, 5%, 4%.

They are also characterised by a BET specific surface area of greater than or equal to 1 $m^2/g$, preferably 1.2 $m^2/g$, preferably 1.4 $m^2/g$.

The porosity of the raw briquettes is greater than or equal to 20%, preferably greater than or equal to 22%, more preferably greater than or equal to 24%.

The raw briquettes have an apparent density of between 2.0 and 3.0, preferably between 2.2 and 2.8.

The raw briquettes have good ageing resistance. Thus, when they are exposed to a humic atmosphere containing, for example, 5 to 15 $g/m^3$ of absolute humidity, their mechanical properties (STI) only deteriorate after more than 1.5% mass increase, preferably 2% mass increase, and even more preferably 2.5% mass increase, following the hydration reaction of the quicklime CaO in slaked lime Ca(OH)2.

The burnt briquettes from the present invention have a Shatter Test Index ("STI", i.e., the mass percentage of fines smaller than 10 mm after four 2-metre drops, less than 6%, preferentially less than 4%, 3%, 2%. Indeed, in certain embodiments of the method according to the present invention, the burnt briquettes have a Shatter test index of less than 8%, sometimes less than 6%, less than 4%, less than 3%, or even around 2%.

They are also characterised by a BET specific surface area bigger than or equal to 0.4 $m^2/g$, preferably bigger than or equal to 0.6 $m^2/g$, more preferably bigger than or equal to 0.8 $m^2/g$.

Porosity is greater than or equal to 20%, preferably greater than or equal to 22%, more preferably greater than or equal to 24%.

The burnt briquettes have an apparent density of between 2.0 and 3.0, preferably between 2.2 and 2.8.

The burnt briquettes have good ageing resistance. Thus, when they are exposed to a humic atmosphere containing, for example, 5 to 15 $g/m^3$ of absolute humidity, their mechanical properties (STI) only deteriorate after more than 4% mass increase, preferably 4.5% mass increase, and even more preferably 5% mass increase, following the hydration reaction of the quicklime CaO in slaked lime $Ca(OH)_2$.

EXAMPLES

Example 1

Briquettes of Quicklime, Originating from Milled Quicklime Fines

The milled quicklime fines were prepared using soft-burnt pebble quicklime produced in a parallel flow regenerative shaft kiln. Grinding is performed in a hammer mill fitted with a 2-mm screen and a recirculation loop for sizes larger than 2 mm. These milled quicklime fines contain 71% of particles larger than 90 μm, 37% of particles larger than 500 μm, 21% of particles larger than 1 mm and 1% of particles between 2 and 3 mm. The $t_{60}$ value of the water reactivity test is 0.9 min. The BET specific surface area (measured using nitrogen adsorption manometry after vacuum degassing at 190° C. for at least two hours and calculated in accordance with the multipoint BET method as described in standard ISO 9277:2010E) is 1.7 $m^2/g$. These milled quicklime fines contain 95.7% of CaO and 0.8% of MgO by weight.

A Gericke GCM450 powder mixer with a capacity of 10 $dm^3$ is used, fitted with standard blades with a radius of 7 cm used in rotation at 350 revolutions per minute (i.e. 2.6 m/s). This mixer is used in continuous mode to prepare a mixture containing:

99.75% by weight of these milled quicklime fines,
0.25% by weight of calcium stearate powder.

The total flow rate of the powder is 300 kg/h and the dwell time is 3.5 s. The mixture obtained is very substantially homogeneous.

A tangential press fitted with sleeves with a diameter of 604 mm and a width of 145 mm is used to produce briquettes with a target volume of 7.2 $cm^3$ in the shape of a soap bar (4 rows of 67 pockets per sleeve, i.e. 268 pockets per sleeve) and can develop a linear pressure of up to 120 kN/cm.

Taking 10 tonnes of the mixture, the tangential press is loaded and compacting takes place at a speed of 12 revolutions per minute (i.e. a linear speed of 38 cm/s) at a linear pressure of 120 kN/cm (i.e. a calculated surface pressure of 455 MPa for an angle of 0.5 degrees).

Almost 8.5 tonnes of briquettes with an average volume of 8.2 $cm^3$, an average weight of 19 g and an average density of 2.3 are obtained. These briquettes have a length of around 36 mm, a width of around 26 mm and a thickness of around 15.5 mm. These briquettes develop a BET specific surface area of 1.6 $m^2/g$ and a total mercury pore volume (determined using mercury intrusion porosimetry as per section 1 of standard ISO 15901-1:2005E, which involves dividing the difference between the skeletal density, measured at 30000 psia, and the apparent density, measured at 0.51 psia, by the skeletal density) of 26%.

The reactivity of the briquettes to water is determined by adding 150 g of these briquettes, previously milled into the form of fines with a size of between 0 and 1 mm, to 600 $cm^3$ of water at 20° C. The $t_{60}$ value is 1.1 min.

A Shatter Test is performed using 10 kg of these briquettes by successively dropping them from 2 m, four times. The quantity of the fines smaller than 10 mm generated after these four drops is then weighed. A Shatter Test Index of 3.5% is obtained.

Example 2

Briquettes of Quicklime, Originating from a Mixture of Soft-Burnt Milled Quicklime Fines and Screened Quicklime Fines The milled quicklime fines are those from example 1. The screened quicklime fines were recovered at the end of screening through a 3-mm screen from the unsorted material at the outlet of a rotary kiln fitted with a preheater. These screened quicklime fines contain 74% of particles larger than 90 μm, 60% of particles larger than 500 μm, 47% of particles larger than 1 mm and 18% of particles of between 2 and 3 mm. The $t_{60}$ value of the water reactivity test is 4 min. The BET specific surface area is 1.2 $m^2/g$. These screened quicklime fines contain 97.1% of CaO and 0.7% of MgO by weight.

The mixture, created according to the method in example 1, is formed from:

0.25% by weight of calcium stearate powder,
99.75% by weight of a 50:50 mixture by weight of these milled quicklime fines and of these screened quicklime fines.

Briquettes are produced from this mixture according to the method in example 1. Almost 10 tonnes of briquettes with an average volume of 8.3 $cm^3$, an average weight of 19.2 g and an average density of 2.3 are obtained. These briquettes have a length of around 36 mm, a width of around 26 mm and a thickness of around 15.6 mm. These briquettes develop a BET specific surface area of 1.4 $m^2/g$ and have a total mercury pore volume of 26%.

The reactivity of the briquettes to water is determined by adding 150 g of these briquettes, previously milled into the form of fines with a size of between 0 and 1 mm, to 600 $cm^3$ of water at 20° C. The $t_{60}$ value is 1.8 min.

A Shatter Test is performed using 10 kg of these briquettes by successively dropping them from 2 m, four times. The quantity of the fines smaller than 10 mm generated after these four drops is then weighed. A Shatter Test Index of 4.0% is obtained.

Example 3

Briquettes of Dolomitic Quicklime, Originating from a Mixture of Soft-Burnt Milled Quicklime Fines and Burnt Dolomite Fines The milled quicklime fines are those from example 1. The milled dolomite fines were prepared using soft-burnt pebble quicklime produced in a parallel flow regenerative shaft kiln. Milling was performed in a hammer mill. These milled burnt dolomite fines contain 91% of particles larger than 90 μm, 44% of particles larger than 500 μm, 31% of particles larger than 1 mm and 17% particles larger than 2 mm and 8% of particles of between 3 and 5 mm. The $t_{70}$ value of the water reactivity test is 3.1 min. The BET specific surface area is 2.8 $m^2/g$. These milled burnt dolomite fines contain 58.5% of CaO and 38.4% of MgO by weight.

The mixture, created according to the method in example 1, is formed from:

0.25% by weight of calcium stearate powder,
99.75% by weight of a 70:30 mixture by weight of these milled quicklime fines and of these milled burnt dolomite fines.

Briquettes are produced from this mixture according to the method in example 1. Almost 10 tonnes of briquettes with an average volume of 8.1 $cm^3$, an average weight of 19.1 g and an average density of 2.3 are obtained. These briquettes have a length of around 36 mm, a width of around 26 mm and a thickness of around 15.5 mm. These briquettes develop a BET specific surface area of 2.2 $m^2/g$ and have a total mercury pore volume of 27%.

A Shatter Test is performed using 10 kg of these briquettes by successively dropping them from 2 m, four times. The quantity of the fines smaller than 10 mm generated after these four drops is then weighed. A Shatter Test Index of 4.9% is obtained.

Example 4

Briquettes of Quicklime, Originating from a Mixture of Soft-Burnt Milled Quicklime Fines and Iron Oxide Fines

The milled quicklime fines are those from example 1. The iron oxide fines originate from the milling of an $Fe_2O_3$ hematite iron ore passing through a 150-μm screen and are characterised using a Coulter laser particle size analyser (based on light diffraction and as per the theories of Fraunhofer and Mie) by a $d_{10}$ of 0.5 μm, a $d_{50}$ of 12.3 μm and a $d_{90}$ of 35.7 μm. These iron oxide fines contain 64.6% of Fe.

The mixture, created according to the method in example 1, is formed from:

0.25% by weight of calcium stearate powder, 99.75% by weight of an 80:20 mixture by weight of these milled quicklime fines and of these iron oxide fines.

Briquettes are produced from this mixture according to the method in example 1. Almost 10 tonnes of briquettes with an average volume of 8.5 cm³, an average weight of 22.3 g and an average density of 2.6 are obtained. These briquettes have a length of around 36 mm, a width of around 26 mm and a thickness of around 16.1 mm. These briquettes develop a BET specific surface area of 1.6 m²/g and have a total mercury pore volume of 25%.

The reactivity of the briquettes to water is determined by adding 166.7 g of these briquettes, previously milled into the form of fines with a size of between 0 and 1 mm, to 600 cm³ of water at 20° C. The 166.7 g of briquettes correspond to 150 g of quicklime. The $t_{60}$ value is 1.2 min.

A Shatter Test is performed using 10 kg of these briquettes by successively dropping them from 2 m, four times. The quantity of the fines smaller than 10 mm generated after these four drops is then weighed. A Shatter Test Index of 3.9% is obtained.

Example 5

Briquettes of Quicklime, Originating from Milled Quicklime Fines, Thermally Treated

Using a tonne of briquettes from example 1, arranged in boxes so that the thickness of the briquette bed is 100 mm, thermal treatment of 20 min at 900° C. was performed, with up- and down-ramps in temperature of around 40° C. per minute.

Briquettes with an average volume of 8.2 cm³, an average weight of 19 g and an average density of 2.3 are obtained. These briquettes have a length of around 36 mm, a width of around 26 mm and a thickness of around 15.5 mm. These briquettes develop a BET specific surface area of 1.3 m²/g and have a total mercury pore volume of 27%.

The reactivity of the briquettes to water is determined by adding 150 g of these briquettes, previously milled into the form of fines with a size of between 0 and 1 mm, to 600 cm³ of water at 20° C. The $t_{60}$ value is 1.0 min.

A Shatter Test is performed using 10 kg of these briquettes by successively dropping them from 2 m, four times. The quantity of the fines smaller than 10 mm generated after these four drops is then weighed. A Shatter Test Index of 3.3% is obtained.

Example 6

Briquettes of Quicklime, Originating from a Mixture of Soft-Burnt Milled Quicklime Fines and Iron Oxide Fines, Thermally Treated

Using a tonne of Briquettes from example 4, arranged in boxes so that the thickness of the briquette bed is 100 mm, thermal treatment of 20 min at 1100° C. was performed, with up ramps and down ramps in temperature of around 50° C. per minute.

Briquettes with an average volume of 8.5 cm³, an average weight of 22.2 g and an average density of 2.6 are obtained. These briquettes have a length of around 36 mm, a width of around 26 mm and a thickness of around 16.1 mm. These briquettes develop a BET specific surface area of 0.9 m²/g and have a total mercury pore volume of 27%.

The reactivity of the briquettes to water is determined by adding 178.2 g of these briquettes, previously milled into the form of fines with a size of between 0 and 1 mm, to 600 cm³ of water at 20° C. The 178.2 g of briquettes correspond to 150 g of free lime (i.e. not in the form of calcium ferrites). The $t_{60}$ value is 1.5 min.

A Shatter Test is performed using 10 kg of these briquettes by successively dropping them from 2 m, four times. The quantity of the fines smaller than 10 mm generated after these four drops is then weighed. A Shatter Test Index of 1.2% is obtained.

Comparative Example 1

Briquettes of Quicklime, Originating from Screened Quicklime Fines

The screened quicklime fines are those from example 2. The mixture, created according to the method in example 1, is formed from:

99.75% by weight of these screened quicklime fines, 0.25% by weight of calcium stearate powder.

Briquettes are produced from this mixture according to the method in example 1. Almost 10 tonnes of briquettes with an average volume of 8.3 cm³, an average weight of 19.4 g and an average density of 2.3 are obtained. These briquettes have a length of around 36 mm, a width of around 26 mm and a thickness of around 15.6 mm. These briquettes develop a BET specific surface area of 1.2 m²/g and have a total mercury pore volume of 26%.

A Shatter Test is performed using 10 kg of these briquettes by successively dropping them from 2 m, four times. The quantity of the fines smaller than 10 mm generated after these four drops is then weighed. A Shatter Test Index of 11.2% is obtained.

Comparative Example 2

Briquettes of Burnt Dolomite, Originating from Milled Burnt Dolomite Fines

The milled burnt dolomite fines are those from example 3. The mixture, created according to the method in example 1, is formed from:

99.75% by weight of these milled burnt dolomite fines, 0.25% by weight of calcium stearate powder.

Briquettes are produced from this mixture according to the method in example 1. Almost 10 tonnes of briquettes with an average volume of 8.4 cm³, an average weight of 19.9 g and an average density of 2.3 are obtained. These briquettes have a length of around 36 mm, a width of around 26 mm and a thickness of around 16.0 mm. These briquettes develop a BET specific surface area of 2.6 m²/g and have a total mercury pore volume of 26%.

A Shatter Test is performed using 10 kg of these briquettes by successively dropping them from 2 m, four times. The quantity of the fines smaller than 10 mm generated after these four drops is then weighed. A Shatter Test Index of 14.3% is obtained.

Examples 7 to 14

Raw briquettes are produced according to the invention with milled quicklime containing particles sized between 0 and 2 mm, but with different particle size profiles and contents of iron oxide with sizes smaller than 100 μm expressed as $Fe_2O_3$ equivalent ranging from 10% to 60%. The iron oxide used in these examples is characterised by a $d_{10}$ of 0.5 μm, $d_{50}$ of 12.3 μm and $d_{90}$ of 35.7 μm. In each example, the milled quicklime particles sized between 0 and 2 mm have at least 30% of particles that are smaller than 90 μm.

Raw briquettes of the same composition were thermally treated at 1100° C. or 1200° C. for 20 minutes in order to obtain burnt briquettes with different contents of quicklime and iron-based compounds. The composition of the briquettes and the thermal treatment performed are shown in Table 1. For these raw and burnt briquettes, several tests were performed and described below using FIGS. 2 to 5.

Figure 2:
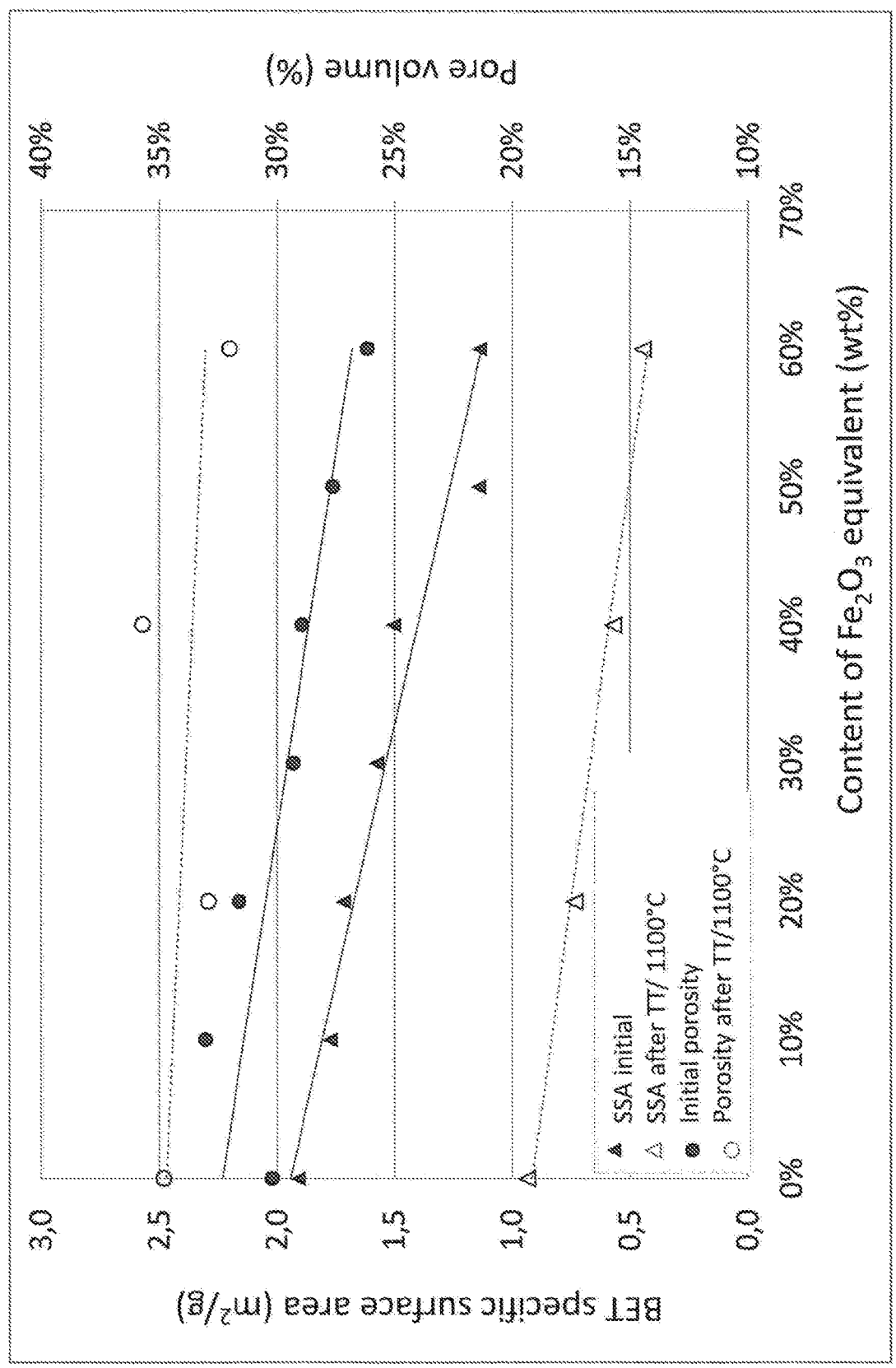
FIG. 2 is a graph of the BET specific surface area and of the porosity using petroleum intrusion (%) depending on the content of $Fe_2O_3$ equivalent in the briquettes according to the present invention.

FIG. 2 presents a graph showing:

the evolution of the BET specific surface area (SSA) based on the content of iron-based compound expressed as $Fe_2O_3$ equivalent for raw briquettes;

the evolution of porosity using petroleum intrusion based on the content of iron-based compound expressed as $Fe_2O_3$ equivalent for raw briquettes;

the evolution of the BET specific surface area (SSA) based on the content of iron-based compound as $Fe_2O_3$ equivalent for burnt briquettes having been subjected to thermal treatment (TT) of 1100° C. for 20 minutes; and the evolution of porosity based on the content of iron-based compound as $Fe_2O_3$ equivalent for burnt briquettes having been subjected to thermal treatment (TT) of 1100° C. for 20 minutes.

As can be seen, these porosity and surface area evolutions decreased slightly, in a linear manner, with the content of iron-based compound for raw and burnt briquettes. Burnt briquettes have a smaller specific surface area than raw briquettes, although they have higher porosity for identical contents of iron-based compound.

Figure 3:
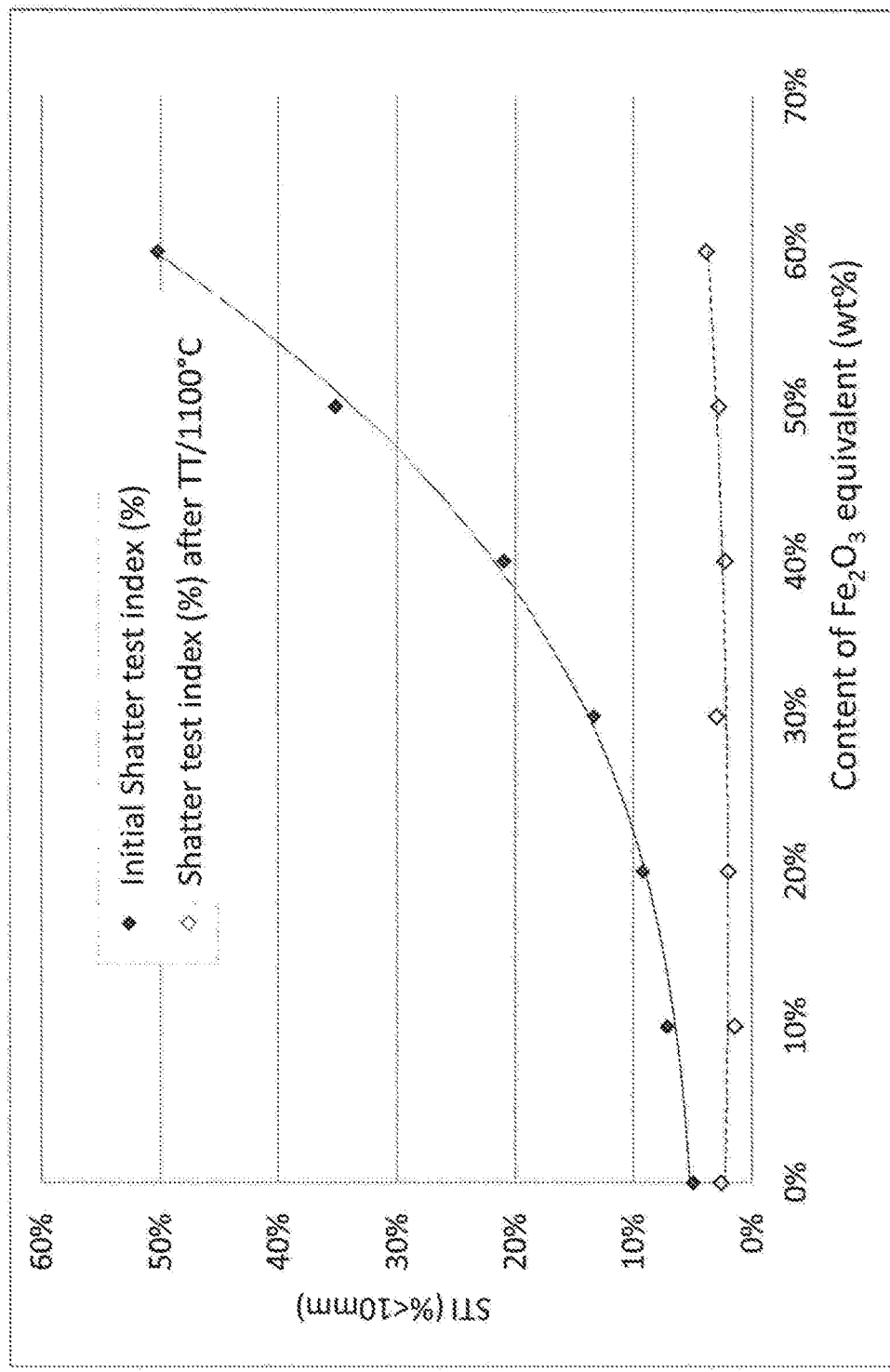
FIG. 3 is a graph of the Shatter test index (STI) depending on the content of $Fe_2O_3$ equivalent in the burnt and raw briquettes according to the present invention.

FIG. 3 presents a graph showing:

the evolution of the Shatter test index for raw briquettes, based on the contents of iron-based compound expressed as $Fe_2O_3$ equivalent; and the evolution of the Shatter test index for burnt briquettes having been thermally treated at a temperature of 1100° C. for 20 minutes, based on the contents of iron-based compound expressed as $Fe_2O_3$ equivalent.

As can be seen, the Shatter test indices are less than 20% for raw briquettes with contents of iron-based compound expressed as $Fe_2O_3$ equivalent of less than 40%, whereas for burnt briquettes all Shatter test indices are less than 10%, or even 6%.

FIG. 4 shows a graph showing the evolution of the yield of iron-based (iron oxide) converted into calcium ferrite, based on the content of iron oxide expressed as $Fe_2O_3$ equivalent.

As can be seen, the calcium ferrite conversion yield begins to decrease for contents of iron oxide expressed as $Fe_2O_3$ equivalent of greater than 40%.

FIG. 5 presents the evolution of the content of calcium ferrites expressed as $Fe_2O_3$ equivalent in the burnt briquettes based on the content of iron oxide expressed as $Fe_2O_3$ equivalent in the raw briquettes before thermal treatment.

As can be seen, the contents of calcium ferrites in the burnt briquettes increase with the content of iron oxide in the raw briquettes. Nevertheless, this evolution reaches a maximum of 50% in content of calcium ferrite for contents of iron oxide in the raw briquettes in a range of between 40 and 45%, before decreasing to contents of calcium ferrites of around 40% for contents of iron oxide in raw briquettes of 60%.

Nevertheless, it is possible to increase the yield of conversion from iron oxide to calcium ferrites to above 90% and to obtain contents of calcium ferrite in the burnt briquettes to above 50%, or even above 70%, for example by increasing the temperature of the thermal treatment to up to 1200° C. or by optimising the milling of the quicklime so as to increase the proportion of particles of quicklime smaller than 90 μm, or a combination of one and the other. Several examples were carried out and measured and presented in table 1.

TABLE 1

| Examples | $Fe_2O_3$ equivalent % | Heat treatment T ° | Type of CaO | Conversion to calcium ferrites % | % of calcium ferrites in the burnt briquette |
|---|---|---|---|---|---|
| Ex. 7 | 20% | 1200° C | CaO < 2 mm, of which 30% < 90 μm | 95% | 31% |
| Ex. 8 | 30% | 1200° C. | CaO < 2 mm, of which 30% < 90 μm | 98% | 47% |
| Ex. 9 | 40% | 1200° C. | CaO < 2 mm, of which 30% < 90 μm | 98% | 58% |
| Ex. 10 | 50% | 1200° C. | CaO < 2 mm, of which 30% < 90 μm | 97% | 74% |
| Ex. 11 | 50% | 1100° C. | 50% of (CaO < 2 mm, of which 30% < 90 μm) + 50% of CaO < 90 μm | 90% | 65% |

TABLE 1-continued

| Examples | Fe$_2$O$_3$ equivalent % | Heat treatment T ° | Type of CaO | Conversion to calcium ferrites % | % of calcium ferrites in the burnt briquette |
|---|---|---|---|---|---|
| Ex. 12 | 50% | 1100° C. | 100% of CaO < 90 μm | 96% | 73% |
| Ex. 13 | 50% | 1200° C. | 50% of (CaO < 2 mm, of which 30% < 90 μM) + 50% of CaO < 90 μm | 99% | 76% |
| Ex. 14 | 50% | 1100° C. | CaO < 2 mm, of which 30% < 90 μm | 61% | 43% |

Comparative Example 3

The Shatter test indices were compared with the compressive force on several samples of raw briquettes to establish the correlation between the Shatter test index and the compressive force. The raw briquettes tested included quicklime with a particle size of 0 to 3 mm with different contents of iron oxide, from 0 to 60% by weight and different contents of lubricant ranging from 0.125 to 0.5% by weight, relative to the total weight of the briquettes. The parameters of the briquetting process were also modified to ensure that the population for establishing correlation was broad enough.

Figure 1:
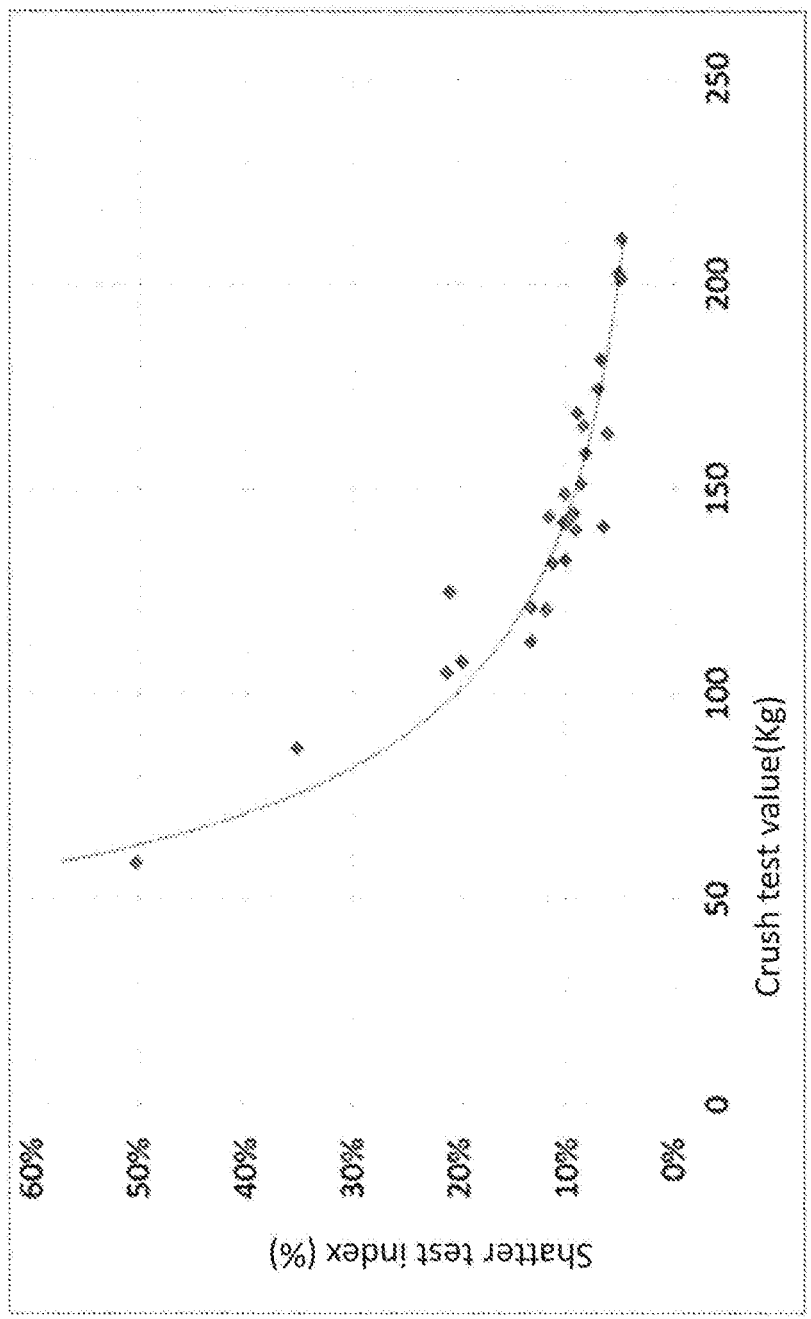
FIG. 1 shows the correlation between the Shatter test index and the compressive force on various samples of briquettes of calco-magnesian compound and optionally of iron-based compound.

As can be seen in FIG. 1, a compressive force of greater than 144 kg, corresponding to 317.5 pounds for briquettes with a Shatter test index of less than 10%, is required.

It is understood that the present invention is in no way limited to the embodiments described above and that many modifications can be made to said embodiments without departing from the scope of the appended claims.

The invention claimed is:

1. Composition in the form of briquettes comprising at least one quick calcium-magnesium compound, said composition having at least 40% by weight of CaO+MgO equivalent, relative to the weight of said composition, characterised in that said calcium-magnesium compound comprises quicklime in the form of milled particles at a concentration of at least 10% by weight and at most 100% by weight relative to the total weight of said composition, said milled particles containing at least 30% by weight of particles having a particle she smaller than 100 μm and having a value $t_{60}$ less than 5 min, said composition in the form of briquettes having a Shatter test index of less than 10%, said Shatter test index being the percentage by weight of fines under 10 mm generated after 4 drops from 2m starting from 10 kg of product, the fines being quantified by sieving through a screen with square mesh of 10 mm after 4 drops from 2m.

2. Composition in the form of briquettes according to claim 1, wherein said briquettes have a maximum size of at least 20 mm.

3. Composition in the form of briquettes according to claim 1, wherein said briquettes have a maximum size of at most 50 mm.

4. Composition in the form of briquettes according to claim 1, wherein said briquettes are raw briquettes and have a BET specific surface area of greater than or equal to 1 m$^2$/g, said specific area being measured using nitrogen absorption manometry after vacuum degassing at 190'C for at least 2 hours and calculated in accordance with BET method described in standard ISO 9277:2010E.

5. Composition in the form of briquettes according to claim 1, wherein said briquettes are burnt briquettes and have a BET specific surface area of greater than or equal to 0.4 m$^2$/g.

6. Composition in the form of briquettes according to claim 1, wherein said briquettes have a porosity of greater than or equal to 20%.

7. Composition in the form of briquettes according to claim 1, wherein said quicklime in the form of milled particles is present at a concentration of at least 15% by weight relative to the total weight of said composition.

8. Composition in the form of briquettes according to claim 1, wherein said quicklime in the form of milled particles is present at a concentration of at most 90% by weight-relative to the total weight of said composition.

9. Composition in the form of briquettes according to claim 1, further comprising a binder or a lubricant with a content of between 0.10 and 1% by weight relative to the total weight of said composition.

10. Composition in the form of briquettes according to claim 1, wherein said briquettes have an average weight per briquette of at least 5 g.

11. Composition in the form of briquettes according to claim 1, wherein said briquettes have an average weight per briquette of less than or equal to 100 g.

12. Composition in the form of briquettes according to claim 1, wherein said briquettes have an apparent density of between 2 g/cm$^3$ and 3.0 g/cm$^3$.

13. Composition in the form of briquettes according to claim 1, characterised in that said quick calcium-magnesium compound further comprises fine particles of calcium-magnesium compound selected from fine particles rejected during screening for the production of pebbles of said quick calcium-magnesium compound, calcium-magnesium filter dust and mixtures thereof, at a concentration of at least 10% by weight and at most 90% by weight relative to the total weight of said composition.

14. Composition in the form of briquettes according to claim 1, characterised in that said composition also comprises one or more iron-based compound(s) at a concentration of at least 3% by weight and at most 60% by weight expressed as Fe$_2$O$_3$ equivalent relative to the total weight of said composition.

15. Composition in the form of briquettes according to claim 1, packaged in types of containers with a contents volume of greater than 1 m$^3$.

16. Composition in the form of briquettes according to claim 1, wherein the briquettes are raw briquettes with a Shatter test index of less than 8%.

17. Composition in the form of briquettes according to claim 1, wherein the briquettes are burnt briquettes with a Shatter test index of less than 6%.

* * * * *